Patented Mar. 1, 1932

1,847,778

UNITED STATES PATENT OFFICE

MICHAEL MELAMID, OF BERLIN-ZEHLENDORF, GERMANY

METHOD OF PERFORMING CHEMICAL REACTIONS

No Drawing. Application filed April 2, 1925, Serial No. 20,246, and in Germany April 5, 1924.

This invention refers broadly to a method of facilitating and intensifying chemical reactions, and it relates, for instance, to sulfonating, nitrating, chlorinating, and nitroso-combination processes, as well as to the introduction of groups into organic compounds, neutralizing and the like, and it is particularly distinguished by employing the substance which it is intended to employ for the reaction, in admixture with a porous body or by the use of a porous body which is impregnated with the reacting substance. In the practice of my invention I may, for instance, employ as carriers for the reagents bodies such as burnt kieselguhr, fuller's earth, bone black and the like. Such carriers which have been imbibed with the reacting medium may be employed as such without any treatment or after having been dried.

The invention presents among other features the important advantage that the chemical reactions are prevented from going on too violently, so as to avoid the occurrence of undesirable secondary reactions which would be liable to give rise to the formation of undesired products. Among other uses the method according to this invention may be employed for the purification and neutralization of oils.

For the purification of oils it has been common to use concentrated sulphuric acid. This mode of procedure, however, presents a great many inconveniences for the industrial application thereof in view of the fact that, as a rule, the sulphuric acid operates too violently upon the oils, so that varying amounts thereof are transformed into sulphocompounds, along with the formation of other undesired secondary reactions. The purification by means of sulphuric acid will, therefore, as a rule result in losses. Now, it has been ascertained that this undesirable, excessively energetic action of the sulphuric acid may be diminished by causing the acid to be taken up by carriers before allowing it to act upon the oils. The process may, for instance, be carried out by treating bleaching earths, such as fuller's earth and the like with sulphuric acid, and by then using the resulting product for the purification of the oils. By acting in this manner any excessive reaction is avoided, and the sulphuric acid in this condition has merely a purifying and decolorizing action upon the oils, and removes all impurities existing as colloidal solutions, and without giving rise to the formation of undesired secondary reaction products. The method may be employed with oils of all kinds which are adapted for purification with sulphuric acid, such as fatty oils, mineral oils, benzols and the like.

By this method it is possible to obtain a culinary oil for table use for rape-seed oil as used in the arts. Then, fish oil, and blubber, may be treated according to this process, and fatty oils generally may be refined in this manner, as well as mineral oils of various kinds, thus for instance, crude oils, tar oils, and it is also possible to remove the unsaturated compounds from cracked benzines. It has, for instance, become possible with this manner of treatment to completely remove the asphaltum from crude mineral oil, while at the same time improving the color of the oil. The same process may likewise be employed with advantage for neutralizing purposes.

Mineral oils, fatty oils and hydrocarbons after purification which is usually effected by means of sulphuric acid, show an acid reaction which must be removed by neutralization. However, this neutralization presents great difficulties on account of the unavoidable emulsification, and the great difficulty to remove such emulsions. It has been ascertained, however, that the neutralization of such products may be carried out with great facility on an industrial scale by replacing the alkaline liquors as such by alkaline liquors which have been absorbed by solid carriers, such as kieselguhr, fuller's earth and the like, as above referred to, in view of the fact found as a result of my experiments that the substances which have been impregnated with the lyes possess the property of neutralizing oils without the formation of emulsions, and to break up any occurring emulsions. The process may, for instance, be employed for the neutralization of mineral oils and of aromatic hydrocarbons, such as benzol, xylol and the like after their purification with sulphuric acid.

There results the important advantage from the use of such porous carriers that, when used in connection therewith, the quantity of the substances employed for the reactions may be considerably reduced. It is sufficient for the purposes of my invention to merely moisten, etch or causticize the pores of the porous substances by the substances producing or starting the reaction. The reacting capacity of the substances is considerably increased thereby. While the cause of this action has not yet been established with certainty I think it to be due to the property of the porous substance of increasing the reaction capacity. It is, therefore, only necessary to impregnate the porous substances with comparatively very small quantities of the substances to be reacted upon, in order to obtain a complete result.

The method or process according to this invention is preferably carried out by impregnating the carriers with the substances to be brought into reaction and in the dilute state, for instance with dilute acids, whereupon the excess of acid or other substance is removed by squeezing or in any other suitable manner and then the greatest amount of the water is removed in any suitable manner, for instance by evaporation, and if required, in vacuo. Thus only very small amounts of active substances remain in the porous body, these substances being exceedingly finely distributed in the pores. These small quantities, however, are sufficient in many cases for the carrying out of the reaction.

The residues left in the refining of mineral oils with kieselguhr previously treated with acids or with similarly treated equivalent substances, and which residues consist mainly of a mixture of kieselguhr with polymerized or asphaltic substances constitute as such a noxious waste product of the process of manufacture. It has now been ascertained in the course of my experiments that such residues may be converted into industrially available substances by simple means, if these residues are treated with sulphonated oils or resins in the presence of alkali, and as particularly advantageous the use of sulphonated so-called "tall-oil" has been found, because this product which is a resinous by-product obtained in the chemical manufacture of pulp from resinous kinds of wood may be obtained at a comparatively low cost in large quantities. It consists mainly of a mixture of resin-acids and of fatty acids, and is preferably produced in considerable quantities in the manufacture of soda-pulp by the so-called sulphate process.

In the practice of this part of the process of my invention the residues are preferably first treated at an increased temperature with alkali, and then an aqueous solution of the sulphonated body is added to the mass resulting from the alkali treatment. Emulsions are produced which are emulsifiable with water in any proportions, and which are adapted for use for a large variety of technical and industrial purposes.

It has been ascertained that the kieselguhr contained in the mixture after the treatment with alkali is an essential agent in the keeping up of the emulsified condition. It is possible that the kieselguhr in such mixtures acts as a binding agent for the other substances.

*Examples of carrying the invention into effect*

1. *Manufacture of nitro-benzol.*—The required quantity of nitric acid for the nitration of benzol is caused to be absorbed by kieselguhr, and the resulting mass is added to the benzol. Heat on the water bath for some hours, and then the resulting nitrobenzol is distilled off.

2. *Sulphonation of castor oil.*—100 kilograms calcined kieselguhr are mixed with 200 kilograms concentrated sulphuric acid; the resulting mixture is introduced into 800 kilograms castor oil, and allowed to stand for some hours with frequent stirring. Then allow to settle, dilute with water, and siphon off the ricinoleic acid formed.

3. 100 kilograms calcined kieselguhr are mixed with 120 kilograms concentrated sulphuric acid, then dried at temperatures exceeding 110° centigrade until the kieselguhr has re-assumed its usual outside appearance. The mass thus produced is sufficient for the purification of 10 thousand kilograms rapeseed oil. The purification is effected by adding the impregnated kieselguhr to the rapeseed oil and agitating vigorously. Then allow to settle, and the purified rapeseed oil is siphoned off or filtered off. A clear purified oil is obtained with almost theoretical yield from which the impurities have been removed.

4. 100 kilograms kieselguhr are impregnated with about 50 kilograms concentrated sulphuric acid and dried down to powdery condition. The mass thus obtained is utilized for the purification of about three thousand kilograms of crude mineral oil with a content of asphaltum of about 1%. The purification in this case is effected in the following manner:—The crude oil contained in a container provided with stirring means is heated to about 30 degrees centigrade. Thereupon the impregnated kieselguhr is added in successive quantities and with vigorous stirring, and agitated for about one hour. Then the crude oil is filtered off. The oil obtained is purified and is free from asphaltum. The yield is almost quantitative.

5. Kieselguhr is stirred and mixed with dilute sulphuric acid, until a pasty mass is obtained which is pressed off from the liquid and is then heated with stirring, until vapors of sulphuric acid escape. 20 kilograms of this mass are sufficient for the complete purification of 1000 kilograms Russian spindle oil.

6. 100 kilograms of mineral oil purified with sulphuric acid are stirred together with about 1% of fuller's earth which has been impregnated with an equal weight of 40% sodium-hydrate, and dried. After the treatment the kieselguhr settles to the bottom, and the dried oil is removed and washed with water.

7. 100 kilograms of the residue remaining in the treatment of mineral oils with sulphuric acid are mixed with 100 kilograms dilute sodium hydrate liquor, and then heated. Between 80 and 100 degrees C. the mass begins to foam, and becomes homogeneous. To this mixture an aqueous solution of 10 kilograms sulphonated, so-called "tall-oil", above referred to are added, and stirred until cool. A brown, thickly fluid mass is obtained which may be emulsified with water in all proportions.

The possibility of carrying out the process according to this invention even with very small quantities of the reagents the amount of which may be so low as to be only sufficient to moisten or etch the porous carriers and the use of reduced pressure or of the vacuum in this invention, constitute a great saving in material and labor, and it should also be noted that the invention is susceptible of various other modifications and alterations to meet the various requirements of use, and that it is subject to no other limitations than are imposed by the scope and spirit of the claim hereunto appended.

I claim:—

A method of performing a chemical reaction consisting in first preparing a purifying agent by impregnating 100 parts of kieselguhr with 50 parts of concentrated sulphuric acid and drying the mixture at a temperature of about 110° C. until a powdered condition is attained; second, heating 3000 parts of crude oil at a temperature of 30° C. under stirring; third, adding said agent in successive quantities under vigorous agitation for about an hour, and lastly, filtering the oil, all quantities being by weight.

Dr. MICHAEL MELAMID.